United States Patent [19]
Stirbl et al.

[11] Patent Number: 5,269,288
[45] Date of Patent: Dec. 14, 1993

[54] METHOD AND APPARATUS FOR GENERATING ATMOSPHERIC SOLAR ENERGY CONCENTRATOR

[76] Inventors: Robert C. Stirbl, 247 Wadsworth Ave., New York, N.Y. 10033; Peter J. Wilk, 185 West End Ave., New York, N.Y. 10023

[21] Appl. No.: 70,680

[22] Filed: Jun. 2, 1993

[51] Int. Cl.$^5$ .............................................. F24J 2/40
[52] U.S. Cl. .............................. 126/593; 219/121.74; 219/121.85; 126/683; 126/698
[58] Field of Search ............... 126/593, 683, 698, 700; 219/121.74, 121.85, 121.6

[56] References Cited
U.S. PATENT DOCUMENTS 4,307,711 12/1981 Doundoulakis ..................... 126/698

*Primary Examiner*—Carroll B. Dority
*Attorney, Agent, or Firm*—R. Neil Sudol; Henry D. Coleman

[57] ABSTRACT

A system for collecting solar radiation includes a laser source for emitting, along a preselected path, radiation having a wavelength absorbable by at least one type of atmospheric molecule. Radiation directing components such as lenses or deformable mirror segments are disposed in the transmission path for directing the laser radiation from the source to a predetermined target region of the atmosphere located a pre-established distance above a surface of the earth. Control componentry is operatively connected to the directing components for controlling the operation thereof to modulate an index of refraction of air in the predetermined target region of the atmosphere to produce in that region a predetermined refractive index pattern such as an atmospheric Fresnel lens for concentrating incoming solar radiation on a solar energy collector. The control componentry is operatively connected to the laser source for timing the emission of radiation therefrom. Sensors are provided for detecting the distribution of the radiation concentration by the atmospheric lens. Feedback circuitry is operatively connected to the sensors and to the beam directing components for modifying the operation thereof in response to signals from the sensors to compensate in real time for changes in atmospheric refractive index arising from atmospheric turbulence, thereby optimizing concentration of solar radiation by the atmospheric region onto the collector.

31 Claims, 4 Drawing Sheets

METHOD AND APPARATUS FOR GENERATING ATMOSPHERIC SOLAR ENERGY CONCENTRATOR

BACKGROUND OF THE INVENTION

This invention relates to the collection of solar energy. More particularly, this invention relates to a method and apparatus for concentrating solar energy.

It is well known that, with the exception of nuclear power, all of the energy on the earth originates with the sun. Extensive efforts in recent decades have been directed to harnassing solar radiation. Such efforts have resulted in huge mirrors erected on the earth's surface for concentrating incoming solar radiation on energy collectors. Another result of the continuing interest in solar energy is the development of solar cells and the arrangement of such cells in different configurations to convert the solar radiation into electricity. Yet another area of development in the field of solar energy is solar panels for converting solar radiation into heat energy.

One well known natural phenomenon is the bending of light waves by heated air. Light refracting convection currents are observable, for example, over road surfaces. The convection currents cause a shimmering or wavering effect in the perception of distant objects across roads or other heated surfaces.

The problem with such convection currents, as other natural phenomena, is that they are essentially uncontrollable. The variation in the index of refraction caused by localized heating of earth bound surfaces is random and unpredictable.

OBJECTS OF THE INVENTION

An object of the present invention is to provide a method for concentrating solar radiation for purposes of energy collection.

Another object of the present invention is to provide an associated apparatus or system for concentrating and collecting solar energy.

Another, more particular, object of the present invention is to provide such a method and associated apparatus which controls the atmospheric index of refraction profile within a predetermined region of the earth's atmosphere to thereby redistribute incoming solar radiation so as to concentrate the radiation at a pre-established location.

A further particular object of the present invention is to provide such a method and assocaited apparatus which at least partially compensates for atmospheric turbulence.

Yet another particular object of the present invention is to provide such a method and apparatus in which atmospheric turbulence is compensated in real time via a feedback loop.

Another object of the present invention is to provide such a method and apparatus in which the energy required to generate the atmospheric solar radiation concentrator is less than the energy derived or collected from the concentrated solar radiation.

These and other objects of the present invention will be apparent from the drawings and detailed descriptions herein.

SUMMARY OF THE INVENTION

A method for collecting solar energy, comprising the steps of (a) generating waveform energy, (b) directing the energy to a predetermined region of the atmosphere located a pre-established distance above a surface of the earth, (c) controlling the step of directing to modulate an index of refraction of air in the predetermined region of the atmosphere to produce a predetermined refraction index pattern in that region, (d) modifying the distribution of solar radiation passing through the atmospheric region to thereby concentrate the solar radiation at a predetermined location on the surface of the earth, and (e) absorbing, at that location, a substantial quantity of the concentrated solar radiation to produce heat energy.

According to another feature of the present invention, the waveform energy is electromagnetic radiation which is generated by operating a laser. The modulation control is effectuated by concentrating the laser generated radiation differentially through the atmospheric region.

The refractive index modulation is accomplished primarily by differential heating of the air in the predetermined region of the atmosphere. However, it is also possible that the modulation is accomplished in whole or in part by ionizing the air within the target region.

The atmospheric index profile in the target region may be modulated so as to produce a solar energy concentrator in the form of an atmospheric lens. More specifically, the index of refraction may be modulated so as to produce an atmospheric index profile approximating a Fresnel lens. It is to be noted that the lens may be or virtually any size, whereby the lens may be adapted to the energy collection requirements of the particular application. Commercial solar energy collection by power companies, for example, may call for larger lenses. However, it is to be noted, that several interspaced atmospheric lenses may be generated, focusing the sun's energy onto the same collector.

According to one embodiment of the present invention, laser radiation is transmitted from a plurality of different sources to the atmospheric region. Accordingly, a plurality of lasers may generate different portions of the same concentrator or lens.

It is to be noted that an atmospheric solar concentrator generated in accordance with the present invention will be effective even if the lens is partial or imperfect. It is only necessary that incoming solar radiation be concentrated onto a collector area. It is not necessary to produce an atmospheric lens capable of image formation. Accordingly, in this specification, the term "atmospheric lens" is used to mean an atmospheric index of refraction profile capable of concentrating incoming solar radiation onto a collector. Generally, the collector is located on the earth's surface, i.e., is an earth bound collector such as a steam generator which is connected to turbines, etc. In some minor applications, the collector may be on a balloon or other air bound device. The collector may even be a satellite in orbit around the earth.

Concomitantly, it is contemplated that the laser or lasers which generate the atmospheric lens are located on the earth's surface. However, it is also within the contemplation of the invention that a lens generating laser is carried on a balloon, airship or satellite.

Where there is a plurality of laser sources, the laser radiation may be simultaneously transmitted from those sources to the same point in the atmospheric target region. Thus, in this embodiment of the invention, each laser in itself generates insufficient energy to ionize or substantially heat the air, while the energy from a plurality of lasers, when converging or crossing at the same target point in the atmosphere, will be sufficient to heat or ionize the air to change the index of refraction at that point. The laser sources may be phase locked to enable and optimize energy collection at the target point.

It is to be noted that the energy density of the individual laser beams may be decreased to a tolerable level (a level insufficient to ionize) by so called beam expanders.

If a single beam of laser radiation is sufficiently powerful to modulate the index of refraction of air, that beam is preferably diffused or expanded prior to transmission through the atmosphere. In addition, the beam is acted upon by lenses and/or mirrors to cause a convergence of the beam so that it is focused at a preselected point in the atmospheric target region. Of course, if several beams are used, one or more of them may be subjected to expansion and focusing steps.

According to another feature of the present invention, one or more lens generating laser beams are swept along a predetermined path through the atmospheric target region. This procedure is especially effective in the event that the atmospheric lens is a Fresnel lens. To generate each zone of the Fresnel lens, a laser beam distribution profile may be formed with a power gradient, the beam having a corresponding gradient at the region of the lens being generated.

Preferably, to optimize the concentration of solar radiation, adaptive optics is utilized to compensate for changes in atmospheric refractive index arising from atmospheric turbulence in the target region of the atmosphere. In general, adaptive optics is used in a feedback loop to compensate for variations in the atmospheric refractive index profile in real time. More particularly, a Fourier transform of an instantaneous atmospheric refractive index profile is iteratively measured for the atmospheric region at the collecting area, and in response to the measured profile, the intensity of laser radiation transmitted to the atmospheric region is varied. The turbulence compensation may be implemented by iteratively changing piston-and-tilt orientations of a plurality of adaptively deformable mirror segments disposed in a radiation transmission path between a laser and the target region in the atmosphere.

A system for collecting solar radiation comprises, in accordance with the present invention, a source for emitting, along a preselected path, radiation having a wavelength absorbable by one or more atmosperic molecules (e.g., water, carbon dioxide, oxygen, nitrogen, etc.). Radiation directing components such as lenses or adaptively deformable mirror segments are disposed in the transmission path for directing the radiation from the source to a predetermined target region of the atmosphere located a pre-established distance above a surface of the earth. Control componentry is operatively connected to the directing components for controlling the operation thereof to modulate an index of refraction of air in the predetermined target region of the atmosphere to produce in that region a predetermined refractive index pattern for concentrating incoming solar radiation on a solar energy collector. The control componentry is operatively connected to the source for timing the emission of radiation therefrom. Sensors are provided for detecting the effectiveness of the radiation concentration by the atmospheric lens. Adaptive optics feedback circuitry and software is operatively connected to these sensors and to the directing components for modifying the operation thereof in response to signals from the sensors to compensate in real time for atmospheric refractive index changes arising from atmospheric turbulence, thereby optimizing concentration of solar radiation by the atmospheric region onto the collector.

The collector may take the form of an evaporator or boiler provided with pipes for steam or another working fluid such as a vapor phase condensate. The pipes or other working fluid conduits are dispsoed in a location onto which the solar radiation is concentrated. Water or another working fluid passing through the pipes is converted into a respective vapor phase by solar energy which is absorbed by heat conductive elements (e.g., metal plates) in contact with the pipes. The vapor is subsequently used to drive steam turbines. Other types of energy collecting apparatus suitable for absorbing concentrated solar radiation and converting substantial portions of the radiation to heat energy are well within the skill of the power arts.

According to a further feature of the present invention, the directing components includes a plurality of deformable mirror segments arranged in a concave array. Orientation devices are operatively connected to the mirrors or mirror segments for independently tilting and pistoning the mirrors or segments.

The turbulence compensation circuitry, which may take the form of a computer with adaptive optics programming, is operatively connected to the orientation devices for controlling the operation thereof in response to signals from the feedback sensors to compensate in real time for refractive index changes induced by turbulence in the atmospheric region. The turbulence compensation circuitry and algorithms include means for controlling the orientation devices to iteratively change orientations of the deformable mirror segments.

Where the source is a laser source, the directing components includes a beam expander to expand the laser beam and thereby prevent heating of air other than in the predetermined target region. The directing components also include elements for focusing the radiation in different amounts at a plurality of points within the atmospheric target region.

As discussed hereinabove, the lens generating radiation source, the directing components, the control algorithms and componentry, the sensors and the turbulence compensation circuitry and software are preferably on the earth's surface and fixed thereto. However, it is possible that one or more of these components are provided in an air vessel(s) or sea-going ship(s) and/or satellite(s).

A method and an associated system in accordance with the present invention provide a relatively inexpensive source of power. Solar radiation which since the beginning of time has fallen on the sides of buildings or on useless ground (desert, semi-arid regions, bodies of water, etc.) can now be harnessed to fall on designated areas, specifically a solar energy collector. Significant solar energy can be concentrated even if the atmospheric lens is only twenty or thirty feet in diameter and is located two or three hundred feet above the earth's surface. The amount of energy passing through the cross-section of such a lens and which is concentrated onto the designated spot can be readily calculated. Of course, greater amounts of solar energy may be concentrated by increasing the size of the atmospheric lens and/or the distance of the lens from the surface of the earth. Different spaced lenses or lens segments may be simultaneously generated for concentrating solar energy on the same area. Lenses may be generated successively in different regions of the atmosphere, thereby allowing for atmospheric relaxation before further attempts aat index modulation.

DETAILED DESCRIPTION

Figure 1:
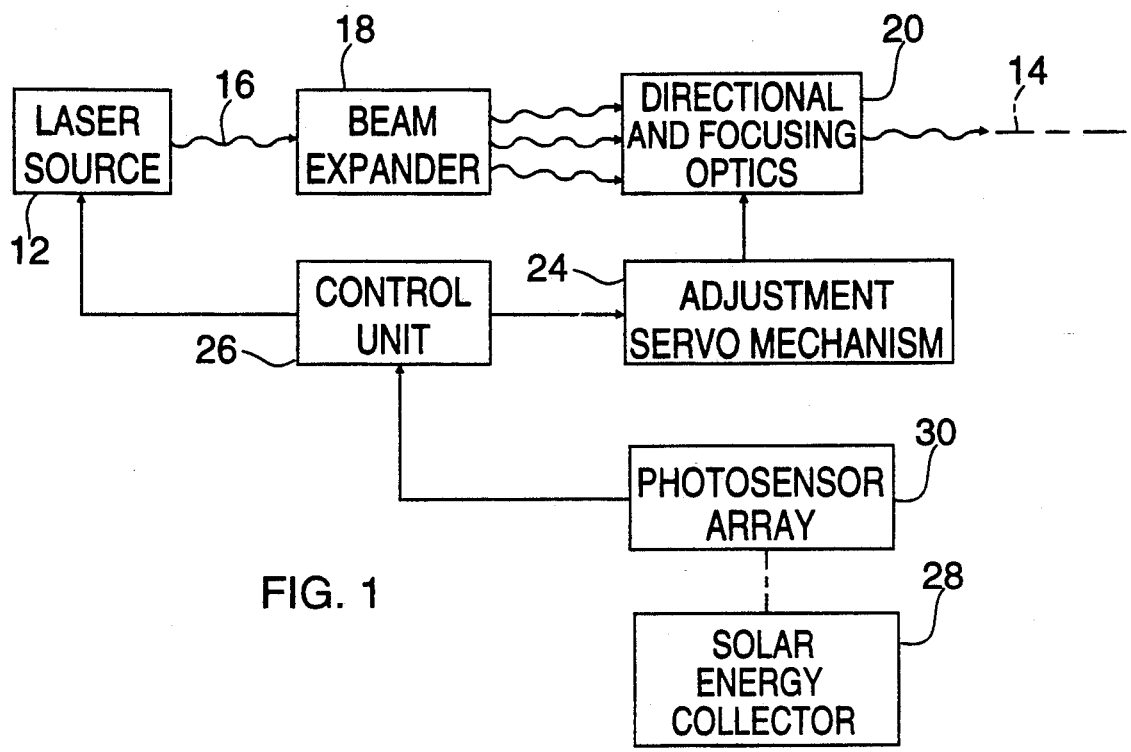
FIG. 1 is a block diagram of a system in accordance with the present invention for generating a predetermined refractive index pattern in a predetermined target region of the atmosphere for purposes of concentrating incoming solar radiation on a solar energy collector.

As illustrated in FIG. 1, a system for collecting solar radiation comprises a laser source 12 for emitting, along a schematically represented preselected path 14, laser radiation 16 having a wavelength absorbable by at least one type of atmospheric molecule. Because the power of laser beam or radiation 16, when emitted from a single source 12, must be sufficiently high to substantially heat or even ionize air, the beam must be expanded by a beam expander 18 prior to transmission through the atmosphere to a target region.

As further illustrated in FIG. 1, radiation directing and focusing optics 20 such as lenses or mirrors (see FIGS. 3 and 4) are disposed in the transmission path 14 for directing the radiation from source 12 to a predetermined atmospheric target 22 (FIG. 2) located a pre-established distance d1 above the earth. A servomechanism assembly 24 responsive to a control unit 26 is operatively connected to the radiation directing and focusing optics 20. Under the control of unit 26, servomechanism assembly 24 adjusts the operation of optics 20 to modulate an index of refraction of air in target region 22 to produce in that region a predetermined refractive index pattern or profile for concentrating incoming solar radiation on a solar energy collector 28.

In subsequent cycles of operation of the system of FIG. 1, when the index of refraction in target region 22 is again modulated to regenerate the desired refractive index pattern or profile, control unit 26 receives feedback from a photosensor array 30 and, in response to that feedback, adjusts the transmission of laser radiation 16 to compensate for atmospheric turbulence in target region 22, as well as in an underlying air volume.

Control unit 26 may be operatively connected to source 12 for timing the emission of radiation therefrom. Thus, source 12 may be energized only during operating cycles of the index modulation system of FIG. 1.

Figure 2:
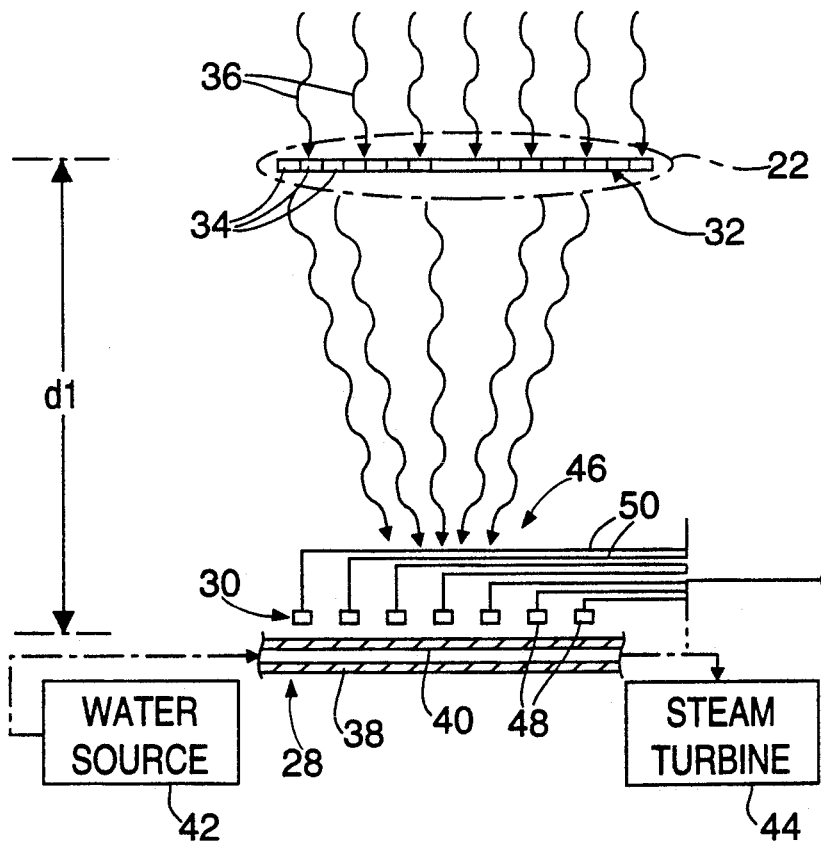
FIG. 2 is a diagram showing an atmospheric Fresnel lens generated by the system of FIG. 1 and further showing a solar energy collector and a photosensor array illustrated in FIG. 1.

As illustrated schematically in FIG. 2, the index modulation system of FIG. 1 acts to generate in target region 22 an atmospheric Fresnel lens 32 having a plurality of generally concentric zones 34 disposed in a generally planar array. Lens 32 is effective to concentrate incoming solar radiation 36 on solar energy collector 28. Collector 28 may take any conventional form where heat energy is absorbed and conveyed away to perform a useful function. For example, collector 28 may comprise a boiler with a metallic plate 38 in thermal contact with a plurality of fluid guiding pipes or channels 40. Pipes 40 are connected at an input end, for example, to a water supply or source 42 and at an output end to a steam turbine 44. Water from supply 42 is turned into steam upon passing through a desiganted target area 46 onto which solar radiation is concentrated by atmospheric lens 32. It is to be understood that other working fluids may be used in substitution for water.

Photosensor array 30 includes a multiplicity of photoelectric sensors 48 disposed in a planar array above collector 28, as indicated in FIG. 2. Photosensors 48 serve essentially to detect the distribution of radiation concentration by lens 32. Feedback circuits 50 operatively connect sensors 48 to control unit 26 which functions via servomechanism assembly 24 to modify the operation of optics 20 in response to signals from the sensors to compensate in real time for changes in atmospheric refractive index caused by turbulence. This feedback loop serves therefore to optimize the concentration of solar radiation by lens 32 onto collector 28.

Figure 3:
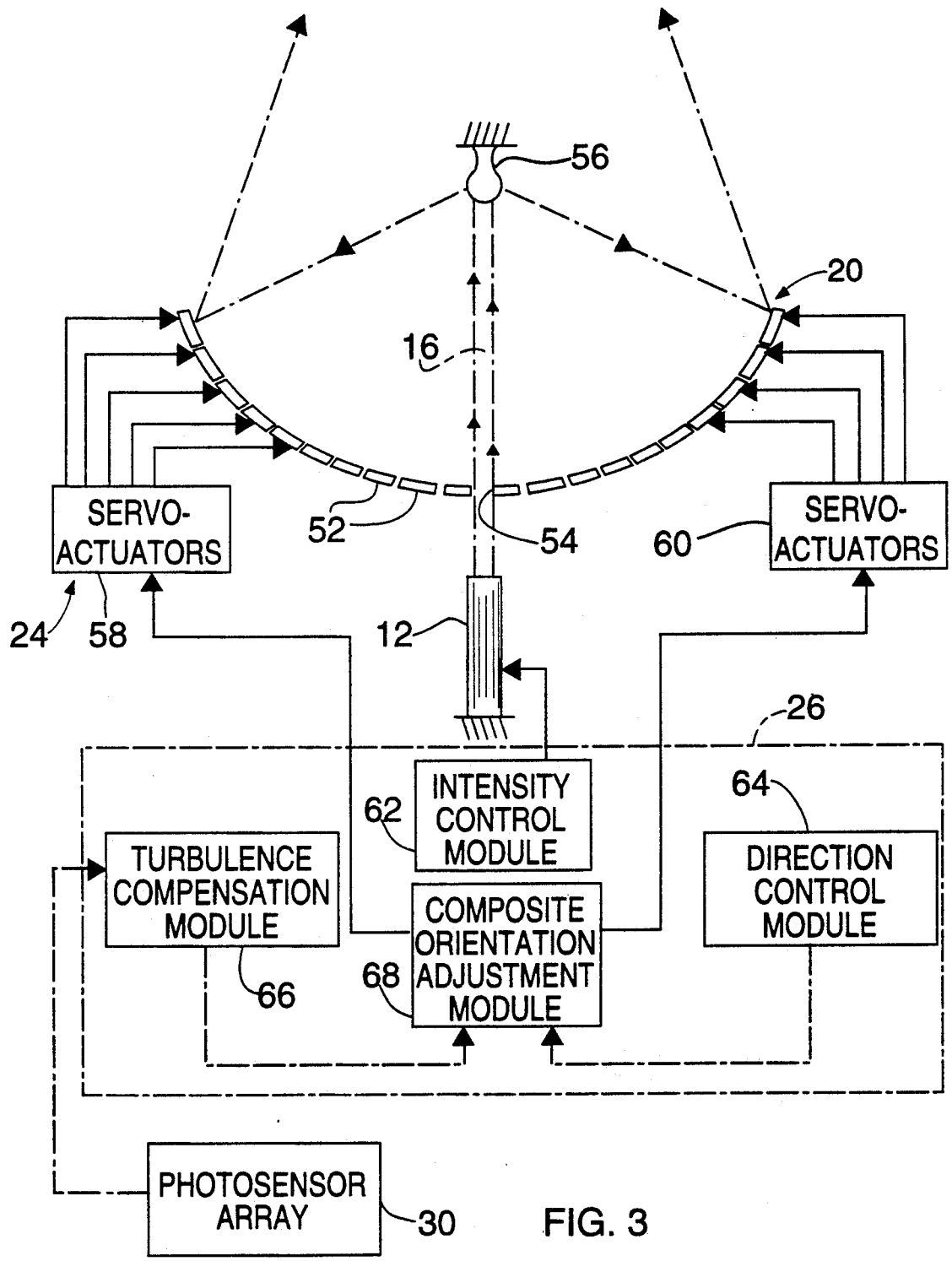
FIG. 3 is a diagram showing a specific embodiment of components illustrated in FIG. 1 including a control unit, directional and focusing optics, and a servomechanism assembly for adjusting the optics.

As shown in FIG. 3, optics 20 includes a plurality of deformable mirror segments 52 disposed in an aspheric concave array in the general surface form of a paraboloid. The deformable mirror array is formed with an aperture 54 through which laser beam 16 passes from laser source 12. Beam 16 is expanded by a convex mirror 56 disposed essentially at the focal point of mirror or mirror segments 52. Mirror 56 thus performs in part the function of beam expander 18 (FIG. 1). Mirror 56 also performs part of the directing function of optics 20.

As additionally shown in FIG. 2, servomechanism assembly 24 (FIG. 1) includes banks of servomechanism actuators 58 and 60 operatively linked to mirror or mirror segments 52 (or to mirror actuators). Generally, each mirror 52 will have one or more dedicated servo-actuators 58, 60 in the form, for example, of piezoelectric crystals. Actuators 58 and 60 function to control the instantaneous orientations of individual deformable mirror segments 52.

Control unit 26 includes a first module 62 for controlling the intensity of energy emitted from laser source 12. In particular, intensity control module 62 determines the times that laser source 12 is actively emitting laser radiation. Control unit 26 also includes a direction control module 64 for determining the orientations of mirror segments 52 necessary to sweep out zones 34 of Fresnel lens 32 (FIG. 2). In response to signals from control module 64, servo-actuators 58 and 60 tilt mirror segments 52 so that the expanded beam from mirror 56 converges to a predetermined point in the target region 22 (FIG. 2). That point shifts in time, for example, along an arc defining a zone 34 of lens 32.

Control unit 26 additionally includes a turbulence compensation module 66 which is operatively connected to servoactuators 58 and 60 for controlling the operation thereof to adjust the orientation of mirror segments 52 (or mirror actuators) in response to signals from photosensors 48 (FIG. 2) to compensate in real time for changes in atmospheric refractive index induced by turbulence in target region 22. Turbulence compensation module includes circuitry or programming for controlling servo-actuators 58 and 60 to iteratively change the orientations of mirror segments 52.

Direction control module 64 and turbulence compensation module 66 are coupled at their outputs to a further module 68 serving to adjust or fine tune the mirror wavefront operations determined by direction control module 64 in accordance with the compensation requirements determined by module 66. Module 68 is connected to servo-actuators 58 and 60 to modify the orientations and positions of mirror segments 52 (or mirror actuators) to produce atmospheric Fresnel lens 32.

Intensity control module 62, direction control module 64 and composite orientation and position adjustment module 68, as well as turbulence compensation module, may be configured by hard wired circuits and/or specialized programming of a general purpose computer. In the event that the functions of modules 62, 64, 66 and 68 are programmed, the programming is a straightforward technical exercise for one of ordinary skill in the art of adaptive optics. Adaptive optics is used, for example, in astronomy, to adjust the orientations of the multiple individual deformable sections of segmented telescope mirrors to compensate in real time for atmospheric refractive index changes caused by turbulence and thereby obtain clear images of stellar bodies. The operation of turbulence compensation module 66 is essentially an operation in adaptive optics. Photosensor array 30 provides the feedback necessary to control instantaneous mirror orientation.

Figure 4:
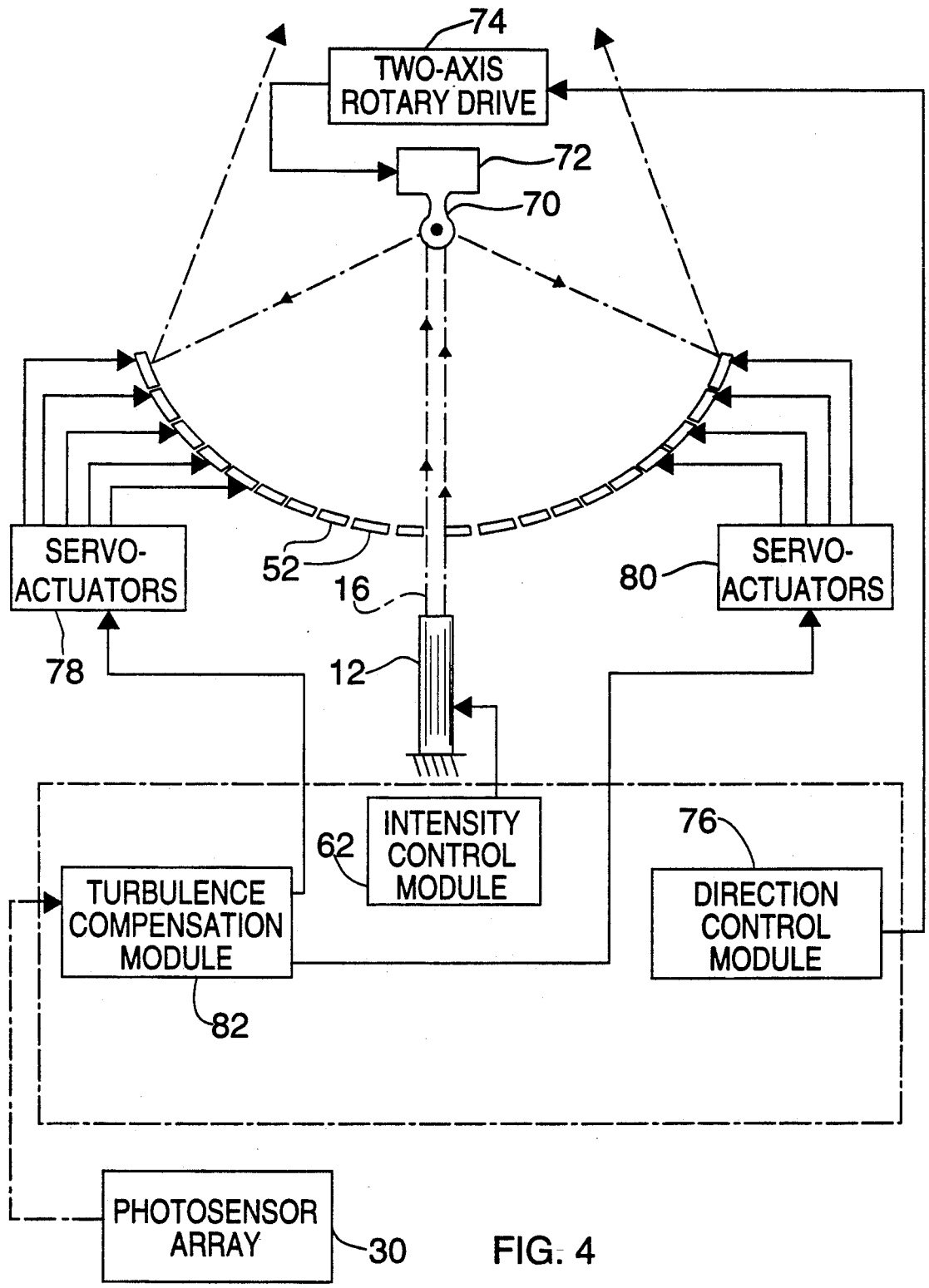
FIG. 4 is a diagram similar to FIG. 3 depicting an alternative embodiment of components illustrated in FIGS. 1 and 3.

In FIGS. 3 and 4, the same structures bear like reference designations. The embodiment illustrated in FIG. 4 separates, in optics 20, the turbulence compensation function from the overall directional function. Accordingly, a beam expanding mirror 70 is connected to a rotary carrier 72 which is operatively coupled to a two-axis rotary drive 74. Drive 74 is activated by a direction control module 76 which functions similarly to module 64 in the embodiment of FIG. 3. Via rotary carrier 72, control module 76 rotates mirror 70 in coordination with the emission of varying radiation intensities from laser source 12.

In the embodiment of FIG. 4, servo-actuators 78 and 80 are connected to respective deformable mirror segments 52 for adjusting the orientations thereof in response to signals from a turbulence compensation module 82 which functions similarly to corresponding module 66 in FIG. 3 to instantaneously compensate for the effects of atmospheric turbulence as detected by photosensor array 30.

Photosensors 48 cooperate with turbulence compensation module 66 or 82 to determine the sharpness or degree of concentration of the incoming solar energy. To that end, sensor array 30 advantageously extends over an area larger than the designated area 46 of impingement of the incoming concentrated solar radiation. Turbulence compensation module 66 or 82 uses signals from photosensors 48 to determine whether solar radiation is falling only on the designated target area 46 or is falling outside the designated area.

Figures 5, 6:
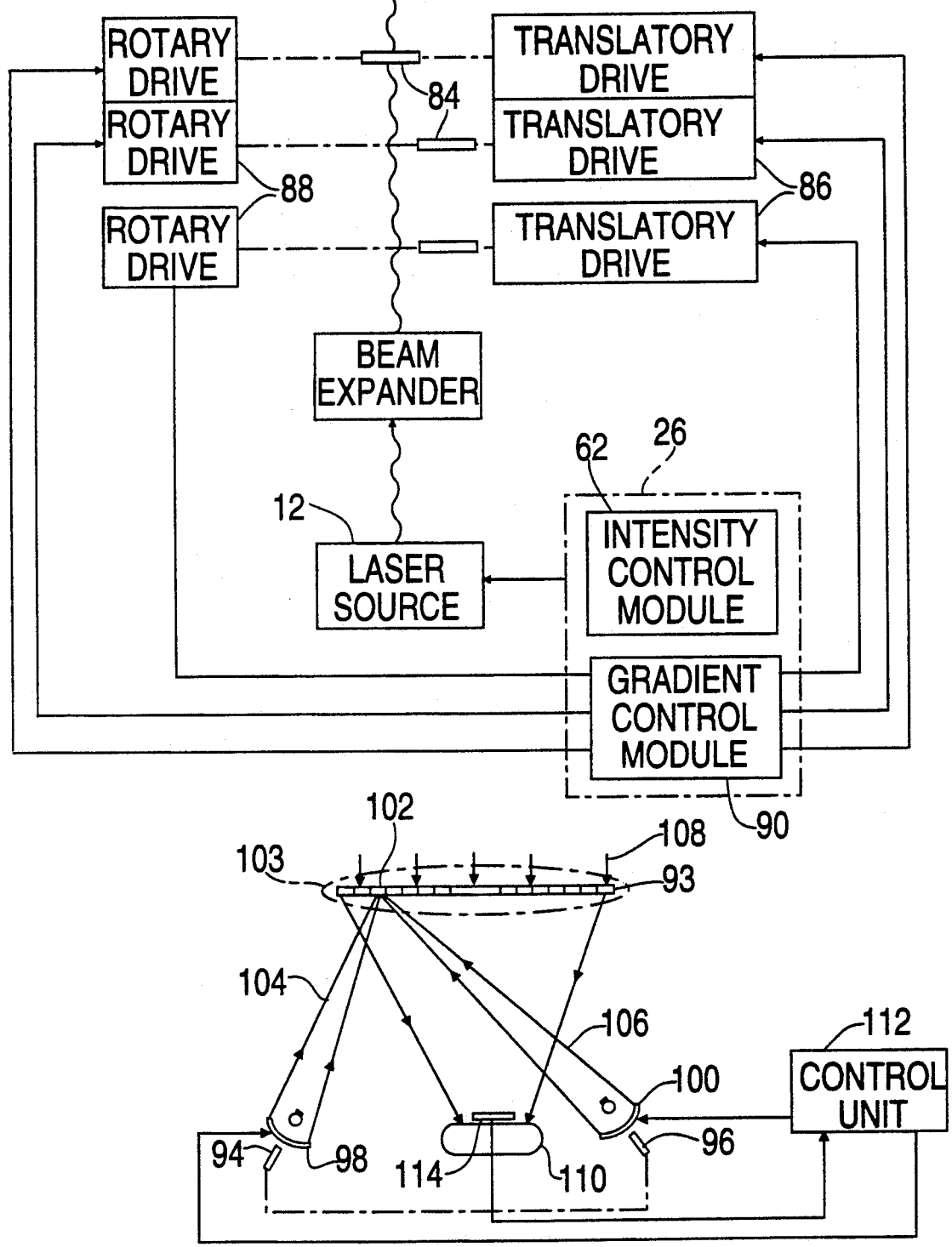
FIG. 5 is a block diagram illustrating a modification of the system of FIG. 3 or 4.
FIG. 6 is a diagram of yet another embodiment of the system of FIG. 1.

As in all Fresnel lenses, zones 34 of Fresnel lens 32 have different refractive index gradients depending on the distance of the respective zones from the center of the respective lens. In one mode of operation, laser beam 16 can be used to sweep out a single zone 34 in a single pass. To achieve that end, it is necessary to provide beam 16 with a gradient corresponding to the gradient of the particular lens zone 34. As illustrated in FIG. 5, a plurality of passive or active phase filters 84 having respective power gradients are alternately disposable in the path of beam 16. Each filter 84 is an electronically constructed transform filter or a holographic phase filter connected to a respective linear or angular drive 86 for translating or reciprocating the filter with respect to the beam path. In addition, to account for the curvature of lens zones 34 about the center of lens 32, filters 84 are coupled with respective rotary drives 88. Upon insertion of a selected filter 84 into the beam path by the respective drive 86, the respective rotary drive 88 rotates the filter at a respective predetermined angular velocity.

Drives 86 and 88 are controlled by a gradient module 90 in control unit 26. In the event that the intensity of laser radiation 16 produced by source 12 is too great for ensuring the continued integrity of filters 84, beam 16 may be reimaged at a lower energy density by a beam expander 92 positioned upstream of filters 84. Filters 84 are in turn interdisposed upstream (or upbeam) of mirror segments 52.

FIG. 6 depicts a modified system for generating an atmospheric Fresnel lens 93. A plurality of laser sources 94 and 96 are connected to one another via a phase-locking link 98. Each source 94 and 96 is provided with its own radiation directing and focusing optics 98 and 100.

As illustrated in FIG. 6, in one mode of operation, laser radiation is transmitted simultaneously from sources 94 and 96 to the same convergence point 102 in an atmospheric target region 104. Owing to the phase locking of laser sources 94 and 96, the intensities of beams 104 and 106 from those sources can be adjusted to add at the convergence point 102 to generate sufficient energy to ionize or substantially heat the air at that point.

FIG. 6 shows beams 104 and 106 as expanded beams being focused to convergence point 102 by the respective optics 98 and 100. However, it is possible to dispense with optics 98 and 100, provided that laser sources 94 and 96 produce laser radiation which is insufficiently intense to significantly heat or ionize the atmosphere prior to convergence of beams 104 and 106 at point 102. Only when beams 104 and 106 cross or converge at point 102 do they have sufficient energy to significantly change the index of refraction of the air.

Fresnel lens 93 concentrates incoming solar radiation 108 on a boiler 110. Atmospheric turbulence is compensated by a control unit 112 receiving feedback signals from a photosensor array 114 at collector or boiler 110. Control unit 112 adapts the operation of optics 98 and 100 to real time atmospheric conditions.

It is to be noted that the term "atmospheric lens" as used herein is intended to connote not an image forming lens but rather a refractive air volume of adequate structure to concentrate incoming solar rays upon a defined energy absorption or collection station. Such a refractive air volume is preferably in the form of a Fresnel lens like structure. However, other shapes are also within the contemplation of the instant invention. For example, the heated or ionized air volume may have outwardly convex upper and lower boundaries.

Alternatively, the concentration of solar radiation on a collector may be accomplished by modulating the index of refraction in a predetermined region of the atmosphere to generate a diffraction pattern or volume serving to concentrate incoming radiation.

It is to be further noted that the radiation which is differentially focused in a predetermined pattern to produce the atmospheric lens may be any wavelength or range of wavelengths capable of being absorbed by one or more major atmospheric constituent molecules (e.g., water, carbon dioxide, oxygen, nitrogen, etc.) in sufficient quantities to effectuate a change in the refractive index of the air. For instance, microwave energy may be used.

In addition, the source or sources of the modulating radiation need not be on the earth's surface but may instead be located in hot air balloons or on satellites.

Although the invention has been described in terms of particular embodiments and applications, one of ordinary skill in the art, in light of this teaching, can generate additional embodiments and modifications without departing from the spirit of or exceeding the scope of the claimed invention. It is to be noted that a lens generating laser beam in accordance with the present invention may be provided with an intensity gradient by other techniques equivalent to the filtering technique described hereinabove with respect to FIG. 5. For example, a laser beam may be differentially expanded so that some portions of the beam have a higher intensity than other portions. Such differential expansion may be accomplished by forming expander 56 or 70 with an assymetric surface.

Accordingly, it is to be understood that the drawings and descriptions herein are profferred by way of example to facilitate comprehension of the invention and should not be construed to limit the scope thereof.

What is claimed is:

1. A method for collecting solar energy, comprising the steps of:
    generating waveform energy;
    directing said energy to a predetermined region of the atmosphere located a pre-established distance above a surface of the earth;
    controlling said step of directing to modulate an index of refraction of air in said predetermined region of the atmosphere to produce a predetermined refraction index pattern in said region;
    modifying the distribution of solar radiation passing through said region to thereby concentrate the solar radiation at a predetermined location on said surface; and
    absorbing, at said location, a substantial quantity of the concentrated solar radiation to produce heat energy.

2. The method defined in claim 1 wherein said waveform energy is electromagnetic radiation and said step of generating includes the step of generating said electromagnetic radiation via a laser, said step of controlling including the step of concentrating the laser generated radiation differentially through said region.

3. The device defined in claim 2 wherein said step of directing includes the step of transmitting laser radiation from a plurality of different sources to said region.

4. The method defined in claim 3 wherein said step of transmitting includes the step of transmitting the laser radiation simultaneously to the same point in said region, further comprising the step of phase locking said sources.

5. The method defined in claim 3 wherein said step of transmitting includes the step of transmitting laser beams from said sources to different points in said region at any one time.

6. The method defined in claim 2, further comprising the step of expanding a beam of laser radiation produced during said step of generating, said step of directing including the step of transmitting the expanded beam through the atmosphere to said region, said step of controlling including the step of focusing the expanded beam to a point in said region.

7. The method defined in claim 6 wherein said step of controlling includes the step of sweeping the focused beam along a predetermined path through said region.

8. The method defined in claim 7 wherein said step of controlling further includes the step of generating a power gradient within said beam, the focused beam having a corresponding gradient.

9. The method defined in claim 2 wherein said step of controlling includes the step of utilizing adaptive optics to compensate for refractive index changes induced by atmospheric turbulence in said region.

10. The method defined in claim 9 wherein said step of utilizing adaptive optics includes the steps of:
    detecting an effect of an instantaneous atmospheric refractive index profile for said region on a power distibution over an energy collecting area; and
    in response to said step of detecting, varying an intensity of laser radiation transmitted to said region to compensate for variations in said atmospheric refractive index profile in real time.

11. The method defined in claim 10 wherein said step of varying includes the step of iteratively changing orientations of a plurality of mirror segments disposed in a radiation transmission path between said laser and said region.

12. The device defined in claim 1 wherein said predetermined refraction index pattern is essentially an atmospheric lens in said region, said step of modifying including the step of refracting the incoming solar radiation through said lens.

13. The method defined in claim 12 wherein said step of controlling includes the step of controlling the index of refraction to produce a Fresnel type atmospheric lens.

14. The method defined in claim 1 wherein said step of controlling includes the step of differentially heating the air in said region.

15. The method defined in claim 14 wherein said step of differentially heating includes the step of controlling the heating to produce a Fresnel type atmospheric lens.

16. The method defined in claim 1 wherein said step of modulating includes the step of ionizing air in said region.

17. A system for collecting solar radiation, comprising:
    source means for emitting, along a preselected path, radiation having a wavelength absorbable by at least one type of atmospheric molecule;
    directing means in said path for directing said radiation from said source to a predetermined region of the atmosphere located a pre-established distance above a surface of the earth;
    control means operatively connected to said directing means for controlling the operation thereof to modulate an index of refraction of air in said region of the atmosphere to produce in said region a predetermined refraction index pattern for concentrating incoming solar radiation on a solar energy collector, said control means being operatively connected to said source means for timing the emission of radiation therefrom;

sensor means for detecting effectiveness of concentration of incoming solar radiation by said atmospheric lens; and compensation means operatively connected to said sensor means and to said directing means for modifying the operation of said directing means in response to signals from said sensor means to compensate in real time for changes in atmospheric refractive index induced by atmospheric turbulence, thereby optimizing concentration of solar radiation by said region on said collector.

18. The system defined in claim 17 wherein said directing means includes a plurality of plane mirror segments arranged in a concave array, further comprising orientation means operatively connected to said mirror segments for independently tilting said mirror segments.

19. The system defined in claim 18 wherein said compensation means is operatively connected to said orientation means for controlling the operation thereof in response to signals from said sensor means to compensate in real time for changes in atmospheric refractive index arising from turbulence in said region.

20. The system defined in claim 19 wherein said compensation means includes means for controlling said orientation means to iteratively change orientations of said mirror segments.

21. The system defined in claim 17 wherein said source means includes at least one radiation source, said directing means including means for expanding radiation from said radiation source to prevent heating of air other than in said region, said directing means also including focusing means for focusing said radiation in different amounts at a plurality of points within said region.

22. The system defined in claim 21 wherein said radiation source is a laser source.

23. The system defined in claim 17 wherein said source means, said directing means, said control means, said sensor means and said compensation means are fixed to a surface of the earth.

24. The system defined in claim 19 wherein said source means includes a plurality of laser sources spaced from one another, further comprising means operatively connected to said laser sources for ensuring that said laser sources operate in phase with one another.

25. The system defined in claim 17 wherein said directing means includes means for sweeping a beam of radiation from said source means along a predetermined path through said region.

26. The system defined in claim 17 wherein said directing means includes means for generating a power gradient within a beam of radiation from said source means, whereby air in said region is differentially heated or ionized.

27. A method for collecting solar energy, comprising the steps of:

modulating an index of refraction of air in a predetermined region of the atmosphere located a pre-established distance above a surface of the earth, thereby generating an atmospheric lens in said region;

refracting incoming solar radiation through said lens to concentrate the solar radiation at a predetermined location on said surface; and absorbing, at said location, a substantial quantity of the concentrated solar radiation to produce heat energy.

28. The method defined in claim 27 wherein said step of modulating includes the steps of:

generating at least one beam of laser radiation;

expanding said beam;

transmitting the expanded beam through the atmosphere to said region; and focusing the expanded beam to a point in said region.

29. The method defined in claim 28, further comprising the step of sweeping the focused beam along a predetermined path through said region.

30. The method defined in claim 29, further comprising the step of generating a power gradient within said beam, the focused beam having a corresponding gradient.

31. The method defined in claim 28 wherein said step of modulating includes the step of utilizing adaptive optics to compensate for atmospheric turbulence in a volume of air between a laser source and said region.

* * * * *